(12) United States Patent
Branting

(10) Patent No.: US 6,439,639 B1
(45) Date of Patent: Aug. 27, 2002

(54) TRAILER HITCH ENCLOSURE DEVICE

(76) Inventor: Wayne V. Branting, 6201 Boulder Hwy Space #160, Las Vegas, NV (US) 89122

( * ) Notice: Subject to any disclaimer, the term of this patent is extended or adjusted under 35 U.S.C. 154(b) by 0 days.

(21) Appl. No.: 09/899,969

(22) Filed: Jul. 6, 2001

(51) Int. Cl.$^7$ .................................................. B60P 7/02
(52) U.S. Cl. ........................ 296/100.09; 296/37.6; 280/423.1
(58) Field of Search ..................... 296/37.6, 100.02, 296/100.06, 100.07, 100.09, 100.1; 280/423.1, 901

(56) References Cited

U.S. PATENT DOCUMENTS

| | | |
|---|---|---|
| 4,216,990 A | 8/1980 | Musgrove et al. |
| 4,685,695 A | 8/1987 | Levee |
| 4,832,359 A | 5/1989 | Rafi-Zadeh |
| 5,056,856 A | 10/1991 | Pederson |
| 5,303,947 A | 4/1994 | Gerber |
| D398,575 S | 9/1998 | Blanton |
| 5,964,495 A * | 10/1999 | Blanton .................. 296/100.02 |

* cited by examiner

*Primary Examiner*—Stephen T. Gordon
*Assistant Examiner*—Patricia L. Engle

(57) ABSTRACT

A trailer hitch enclosure device for providing an opening for a trailer hitch while covering a truck bed. The trailer hitch enclosure device includes a base support including a first elongate member and a second elongate member attached together. The first elongate member is positioned on top edges of and extending between side walls of the truck bed and the second elongate member abuts a top edge of a back wall of the truck bed. Four panels are hingedly coupled to the base support, such that a back pair is coupled to the second elongate member and a second pair is coupled to the first elongate member. The panels have a size adapted for collectively covering the truck bed. The panels attached to the first elongate member have a slot therein facing each other and defining an opening for receiving the hitch of a fifth wheel trailer.

7 Claims, 4 Drawing Sheets

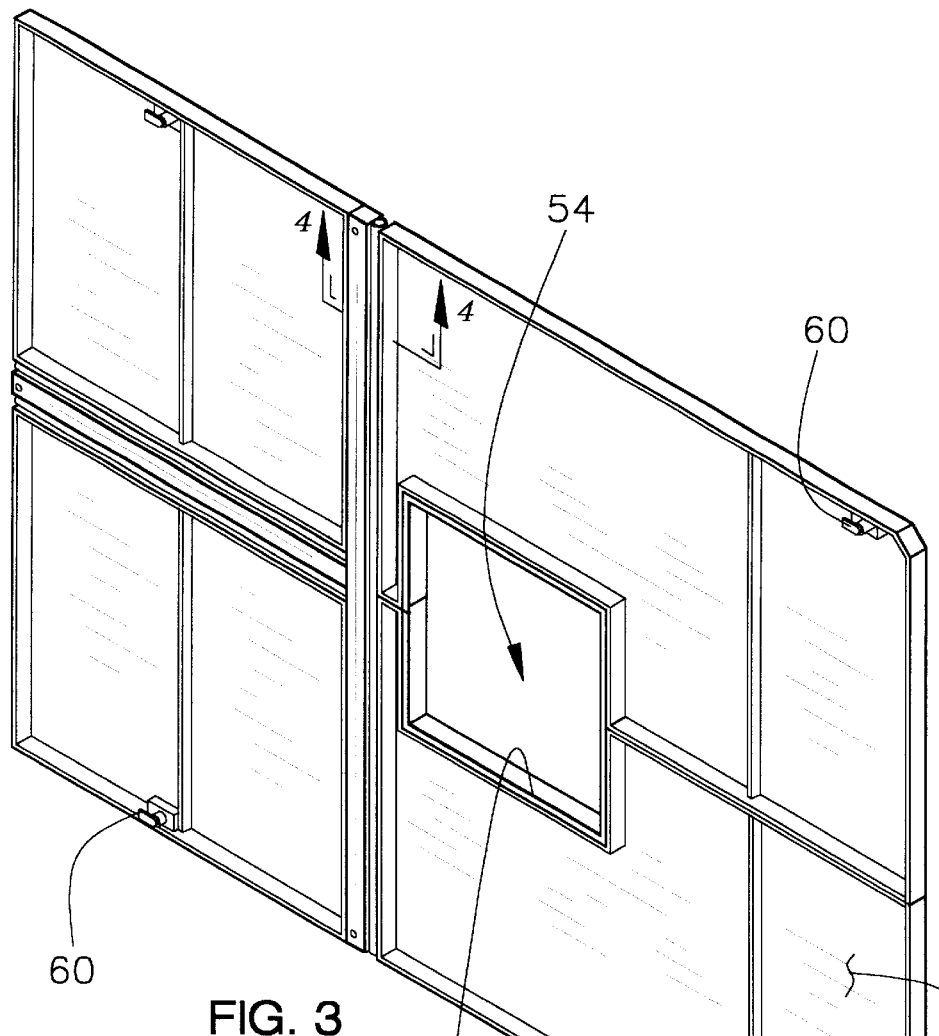
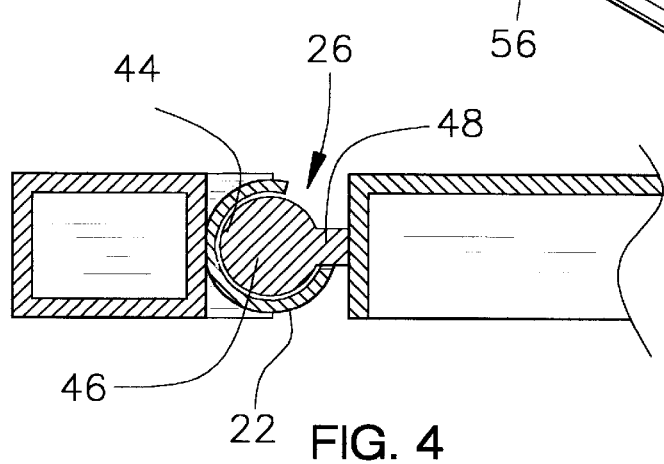
FIG. 3
FIG. 4

TRAILER HITCH ENCLOSURE DEVICE

BACKGROUND OF THE INVENTION

1. Field of the Invention

The present invention relates to trailer hitch covering devices and more particularly pertains to a new trailer hitch enclosure device for providing an opening for a trailer hitch while generally covering an open top side of a truck bed.

2. Description of the Prior Art

The use of trailer hitch covering devices is known in the prior art. More specifically, trailer hitch covering devices heretofore devised and utilized are known to consist basically of familiar, expected and obvious structural configurations, not with standing the myriad of designs encompassed by the crowded prior art which have been developed for the fulfillment of countless objectives and requirements.

Known prior art includes U.S. Pat. Nos. 5,303,947; 4,216,990; 5,056,856; 4,832,359; 4,685,695; and U.S. Des. Pat. No. 398,575.

While these devices fulfill their respective, particular objectives and requirements, the aforementioned patents do not disclose a new trailer hitch enclosure device. The inventive device includes a base support including a first elongate member and a second elongate member attached together such that the base support is generally T-shaped. The first elongate member is positioned on top edges of and extending between side walls of a truck bed such that the second elongate member extends to and is abutting a top edge of a back wall of the truck bed. A plurality of panels each has a top surface, a bottom surface, a first edge, a second edge, a third edge and a fourth edge. The first and third edges are opposite of each other. The plurality of panels comprises 4 panels and define a pair of back panels positioned adjacent to the back wall and a pair of front panels positioned adjacent to a front wall of the truck bed. Each of the second edges of the back panels is hingedly coupled to opposite edges of the second elongate member. Each of the first edges of front panels is hingedly coupled to the first elongate member. The panels have a size adapted for collectively covering an open top side of the truck bed, each of the front panels has a slot therein. The slots face each other and define an opening between the front panels for receiving the hitch of a fifth wheel trailer.

In these respects, the trailer hitch enclosure device according to the present invention substantially departs from the conventional concepts and designs of the prior art, and in so doing provides an apparatus primarily developed for the purpose of providing an opening for a trailer hitch while generally covering an open top side of a truck bed.

SUMMARY OF THE INVENTION

In view of the foregoing disadvantages inherent in the known types of trailer hitch covering devices now present in the prior art, the present invention provides a new trailer hitch enclosure device construction wherein the same can be utilized for providing an opening for a trailer hitch while generally covering an open top side of a truck bed.

The general purpose of the present invention, which will be described subsequently in greater detail, is to provide a new trailer hitch enclosure device apparatus and method which has many of the advantages of the trailer hitch covering devices mentioned heretofore and many novel features that result in a new trailer hitch enclosure device which is not anticipated, rendered obvious, suggested, or even implied by any of the prior art trailer hitch covering devices, either alone or in any combination thereof.

To attain this, the present invention generally comprises a base support including a first elongate member and a second elongate member attached together such that the base support is generally T-shaped. The first elongate member is positioned on top edges of and extending between side walls of a truck bed such that the second elongate member extends to and is abutting a top edge of a back wall of the truck bed. A plurality of panels each has a top surface, a bottom surface, a first edge, a second edge, a third edge and a fourth edge. The first and third edges are opposite of each other. The plurality of panels comprises 4 panels and define a pair of back panels positioned adjacent to the back wall and a pair of front panels positioned adjacent to a front wall of the truck bed. Each of the second edges of the back panels is hingedly coupled to opposite edges of the second elongate member. Each of the first edges of front panels is hingedly coupled to the first elongate member. The panels have a size adapted for collectively covering an open top side of the truck bed, each of the front panels has a slot therein. The slots face each other and define an opening between the front panels for receiving the hitch of a fifth wheel trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new trailer hitch enclosure device apparatus and method which has many of the advantages of the trailer hitch covering devices mentioned heretofore and many novel features that result in a new trailer hitch enclosure device which is not anticipated, rendered obvious, suggested, or even implied by any of the prior art trailer hitch covering devices, either alone or in any combination thereof.

It is another object of the present invention to provide a new trailer hitch enclosure device which may be easily and efficiently manufactured and marketed.

It is a further object of the present invention to provide a new trailer hitch enclosure device which is of a durable and reliable construction.

An even further object of the present invention is to provide a new trailer hitch enclosure device which is susceptible of a low cost of manufacture with regard to both materials and labor, and which accordingly is then susceptible of low prices of sale to the consuming public, thereby making such trailer hitch enclosure device economically available to the buying public.

Still yet another object of the present invention is to provide a new trailer hitch enclosure device which provides in the apparatuses and methods of the prior art some of the advantages thereof, while simultaneously overcoming some of the disadvantages normally associated therewith.

Still another object of the present invention is to provide a new trailer hitch enclosure device for providing an opening for a trailer hitch while generally covering an open top side of a truck bed.

Yet another object of the present invention is to provide a new trailer hitch enclosure device which includes a base support including a first elongate member and a second elongate member attached together such that the base support is generally T-shaped. The first elongate member is positioned on top edges of and extending between side walls of a truck bed such that the second elongate member extends to and is abutting a top edge of a back wall of the truck bed. A plurality of panels each has a top surface, a bottom surface, a first edge, a second edge, a third edge and a fourth edge. The first and third edges are opposite of each other. The plurality of panels comprises 4 panels and define a pair of back panels positioned adjacent to the back wall and a pair of front panels positioned adjacent to a front wall of the truck bed. Each of the second edges of the back panels is hingedly coupled to opposite edges of the second elongate member. Each of the first edges of front panels is hingedly coupled to the first elongate member. The panels have a size adapted for collectively covering an open top side of the truck bed, each of the front panels has a slot therein. The slots face each other and define an opening between the front panels for receiving the hitch of a fifth wheel trailer.

Still yet another object of the present invention is to provide a new trailer hitch enclosure device that allows a person to cover their truck bed of a pick-up type vehicle while still having access to a hitch for a fifth wheel type trailer.

Yet another object of the present invention is to provide a new trailer hitch enclosure device that has panels which are pivotal for opening and also are removable so that the user need not utilize all panels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective bottom view of the present invention.

FIG. 4 is a schematic cross-sectional view taken along line 4—4 in FIG. 3 of the present invention.

DESCRIPTION OF THE PREFERRED EMBODIMENT

Figure 1:
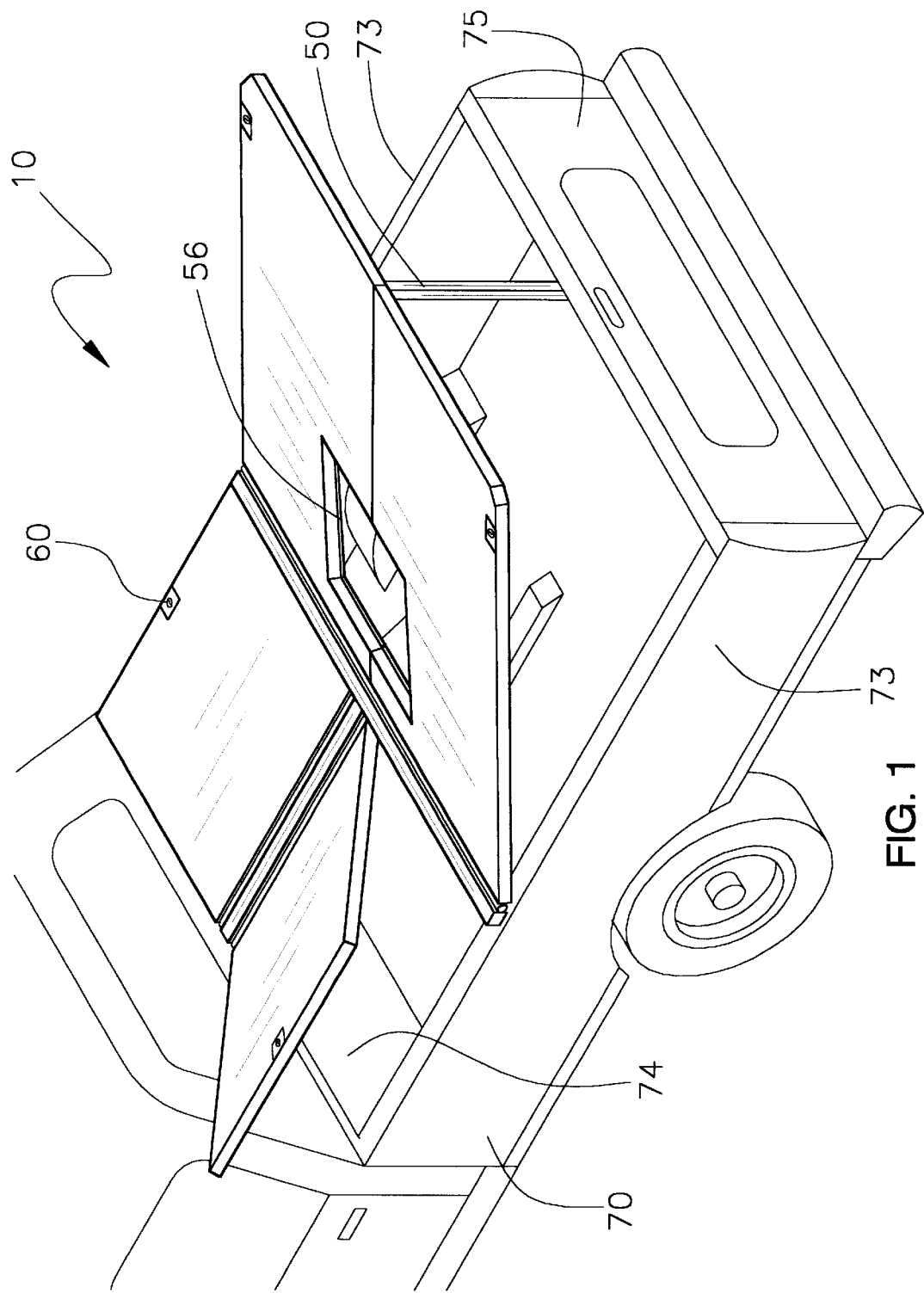
FIG. 1 is a schematic perspective view of a new trailer hitch enclosure device according to the present invention.
Figure 2:
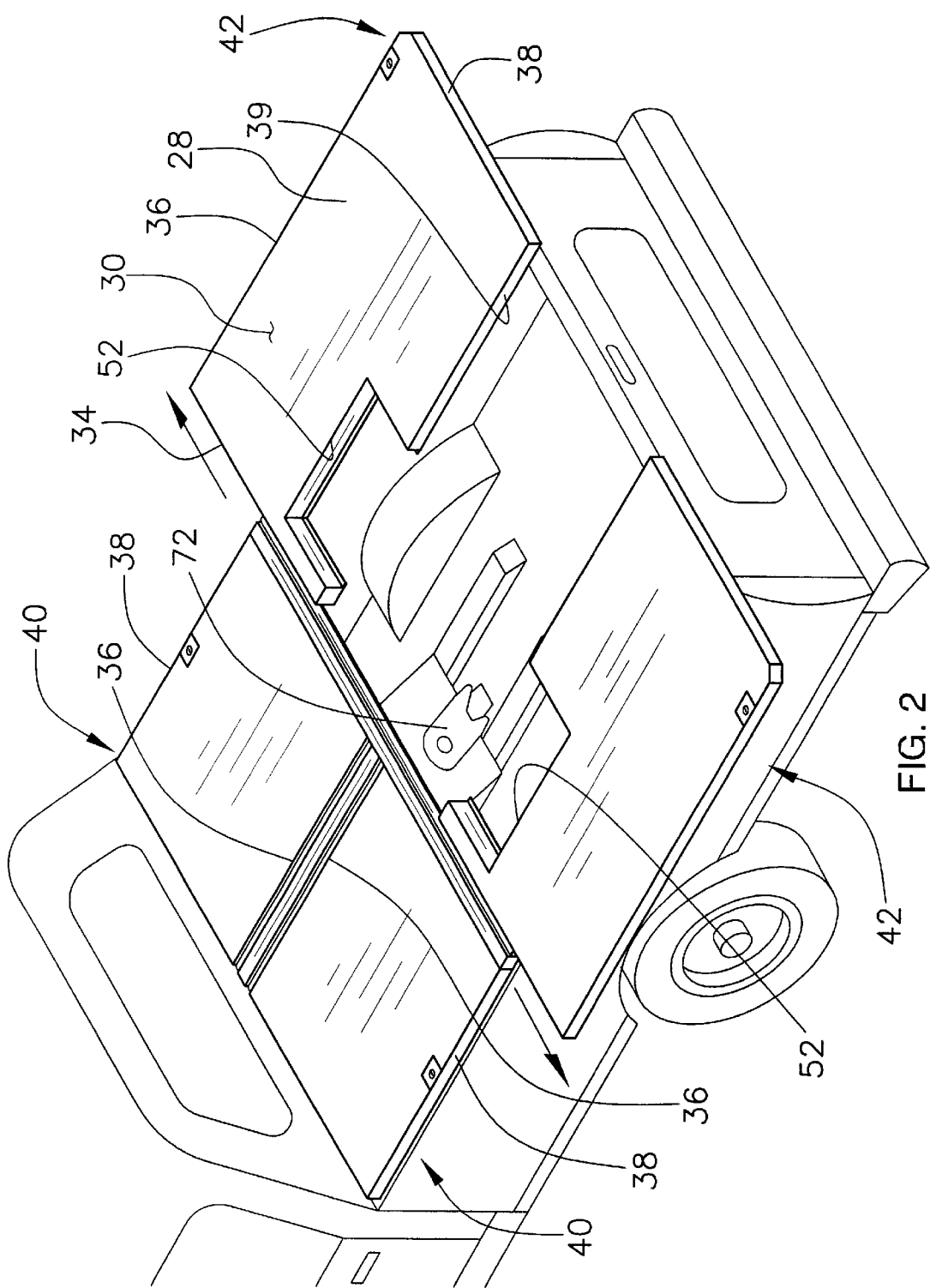
FIG. 2 is a schematic perspective view of the present invention.
Figure 5:
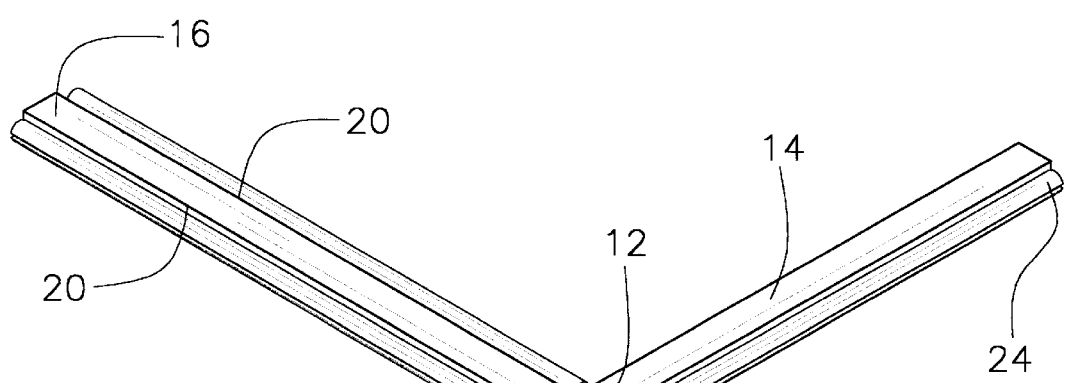
FIG. 5 is a schematic perspective view of the base support of the present invention.
Figure 6:
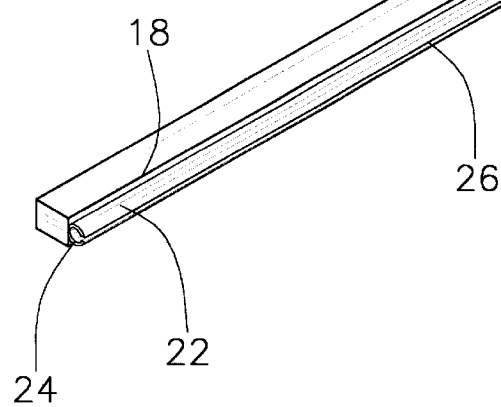
FIG. 6 is a schematic perspective view of the plate and boot cover of the present invention.
Figure 6:
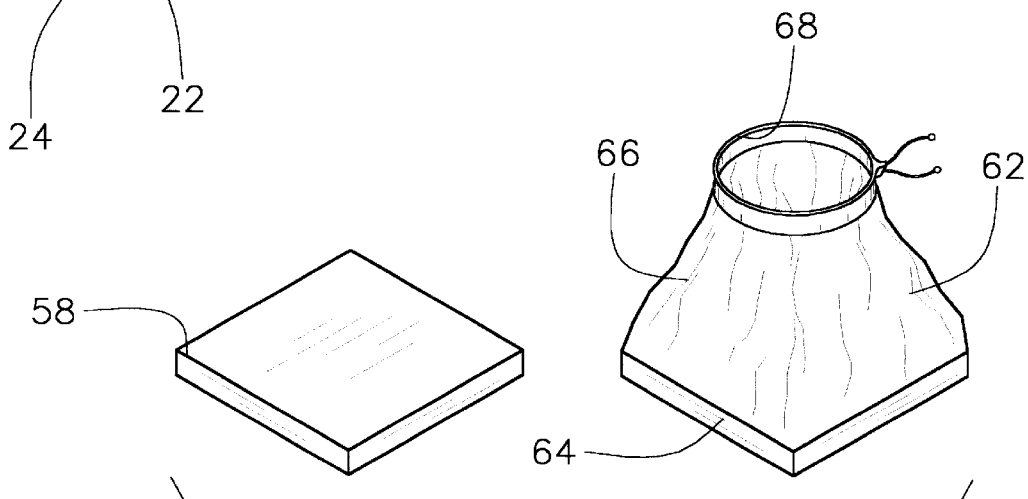

With reference now to the drawings, and in particular to FIGS. 1 through 6 thereof, a new trailer hitch enclosure device embodying the principles and concepts of the present invention and generally designated by the reference numeral 10 will be described.

As best illustrated in FIGS. 1 through 6, the trailer hitch enclosure device 10 generally comprises a device for a truck bed 70 having a trailer hitch 72 therein. The trailer hitch 72 is the type adapted for removably coupling to a fifth wheel trailer. The truck bed 70 has a two side walls 73, a back wall 74 and front wall 75. The device 10 comprises a base support 12 including a first elongate member 14 and a second elongate member 16 attached together such that the base support is generally T-shaped. The first elongate member 14 is positioned on top edges of and extends between the side walls 73 such that the second elongate member 16 extends to and is abutting a top edge of the back wall 74. The first elongate member 14 has a front edge 18 facing away from the second elongate member 16 and the second elongate member 16 has a pair of lateral side edges 20.

Each of three female hitch portions 22 is attached to and extends between opposite ends of the front 18 and lateral side 20 edges. Each of the female hitch portions 22 comprises a cylinder having a pair of open ends 24 and an elongated slot 26 extending between the ends.

A plurality of panels 28 each has a top surface 30, a bottom surface 32, a first edge 34, a second edge 36, a third edge 38 and a fourth edge 39. The first 34 and third 38 edges are opposite of each other. The plurality of panels 28 ideally comprises 4 panels wherein a pair of back panels 40 positioned adjacent to the back wall 74 and a pair of front panels 42 positioned adjacent to the front wall 75 are defined.

Each of a pair of male hinge portions 44 is coupled to and extends along one of the second edges 36 of each of the back panels 40. Each of a pair of male hinge portions 44 is coupled to and extends along one of the first edges 34 of each of the front panels 42. Each of the male hinge portions 44 on the back panels 40 is extended into one of the female hinge portions 22 on the second elongate member 16. Each of the male hinge portions 44 on the front panels 42 is extended into the female hinge portion 22 on the first elongate member 14. Each of the male hinge portions 44 comprises a rod 46 positionable in one of the cylinders and attached along its length to a plate 48 attached to a respective edge of the panels 28. The plate 48 is extendable through the slot 26 and the rod 46 pivotable in the cylinder 22. The panels have a size adapted for collectively covering an open top side of the truck bed 70 when the rods 46 are each positioned in an associated cylinder 22. A pole 50 may be included for holding the panels 28 in an open position as shown in FIG. 1.

Each of the front panels 42 has a slot 52 therein. The slots 52 face each other and define an opening 54 between the front panels 42 when the front panels 42 are abutting each other. Each of the slots 52 has a shoulder 56 thereon. A plate 58 is removably positioned in the opening 54 such that the plate 58 abuts the shoulders 56 and covers the opening 54.

Each of a plurality of locking means 60 is coupled to one of the panels 28 and is adapted for selectively engaging the walls of the truck bed 70. The locking means 60 are conventional and are used for selectively locking the panels 28 in a closed position abutting the walls of the truck bed 70.

In use, the device 10 is positioned on the truck bed 70 as indicated above. The opening 54 between the front panels 42 allows the user to place the hitch of a fifth wheel trailer through the panels 28 while the panels 28 generally cover the opening of the truck bed 70. Also included may be a boot cover 62 for covering the boot of the fifth wheel trailer when it is extended through the opening 54. The boot cover comprising a frame 64 and a sheath 66 extending upwardly from the frame. The frame is abuttable against the shoulder 56. The sheath has a hole 68 therein and covers the boot.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pick-up truck bed cover device for a truck bed having a trailer hitch therein, said trailer hitch being adapted for removably coupling to a fifth wheel trailer, said truck bed having a two side walls, a back wall and front wall, said device comprising:

a base support including a first elongate member and a second elongate member attached together such that said base support is generally T-shaped, said first elongate member being positioned on top edges of and extending between said side walls such that said second elongate member extends to and is abutting a top edge of said back wall;

a plurality of panels each having a top surface, a bottom surface, a first edge, a second edge, a third edge and a fourth edge, said first and third edges being opposite of each other, said plurality of panels comprising 4 panels and defining a pair of back panels positioned adjacent to said back wall and a pair of front panels positioned adjacent to said front wall, each of said second edges of said back panels being hingedly coupled to opposite edges of said second elongate member, each of said first edges of front panels being hingedly coupled to said first elongate member, said panels having a size adapted for collectively covering an open top side of said truck bed, each of said front panels having a slot therein, said slots facing each other and defining an opening between said front panels when said front panels are abutting each other.

2. The pick-up truck bed cover device as in claim 1, wherein said first elongate member has a front edge facing away from said second elongate member, said second elongate member has a pair of lateral side edges, each of three female hitch portions being attached to and extending between opposite ends of said back and lateral side edges, each of a pair of male hinge portions being coupled to and extending along one of said second edges of each of said back panels, each of a pair of male hinge portions being coupled to and extending along one of said first edges of each of said front panels, each of said male hinge portions on said back panels being removably extendable into one of said female hinge portions on said second elongate member, each of said male hinge portions on said front panels being extended into said female hinge portion on said first elongate member.

3. The pick-up truck bed cover device as in claim 2, wherein each of said female hitch portions comprises a cylinder having a pair of open ends and an elongated slot extending between said ends, each of said male hinge portions comprising a rod positionable in one of said cylinders and attached along its length to a plate attached to a respective edge of said panels, each of said plates being extendable through said slots.

4. The pick-up truck bed cover device as in claim 1, wherein each of said slots having a shoulder thereon, a plate being removably positioned in said opening such that said plate abuts said shoulders and covers said opening.

5. The pick-up truck bed cover device as in claim 4, further including a boot cover comprising a frame and a sheath extending upwardly from the frame, the frame beings abuttable against the shoulder such that the sheath extends upwardly from the frame, the sheath have a hole therein for receiving a boot from a fifth wheel trailer.

6. The pick-up truck bed cover device as in claim 1, further including a plurality of locking means, each of said locking means being coupled to one of said plates and being adapted for selectively engaging said walls of said truck bed.

7. A pick-up truck bed cover device for a truck bed having a trailer hitch therein, said trailer hitch being adapted for removably coupling to a fifth wheel trailer, said truck bed having a two side walls, a back wall and front wall, said device comprising:

a base support including a first elongate member and a second elongate member attached together such that said base support is generally T-shaped, said first elongate member being positioned on top edges of and extending between said side walls such that said second elongate member extends to and is abutting a top edge of said back wall, said first elongate member having a front edge facing away from said second elongate member, said second elongate member having a pair of lateral side edges, each of three female hitch portions being attached to and extending between opposite ends of said back and lateral side edges, each of said female hitch portions comprising a cylinder having a pair of open ends and an elongated slot extending between said ends;

a plurality of panels each having a top surface, a bottom surface, a first edge, a second edge, a third edge and a fourth edge, said first and third edges being opposite of each other, said plurality of panels comprising 4 panels and defining a pair of back panels positioned adjacent to said back wall and a pair of front panels positioned adjacent to said front wall, each of a pair of male hinge portions being coupled to and extending along one of said second edges of each of said back panels, each of a pair of male hinge portions being coupled to and extending along one of said first edges of each of said front panels, each of said male hinge portions on said back panels being extended into one of said female hinge portions on said second elongate member, each of said male hinge portions on said front panels being extended into said female hinge portion on said first elongate member, each of said male hinge portions comprising a rod positionable in one of said cylinders and attached along its length to a plate attached to a respective edge of said panels, said panels having a size adapted for collectively covering an open top side of said truck bed wherein each of said panels of a pair having a substantially identical size, each of said front panels having a slot therein, said slots facing each other and defining an opening between said front panels when said front panels are abutting each other, each of said slots having a shoulder thereon, a plate being removably positioned in said opening such that said plate abuts said shoulders and covers said opening;

each of a plurality of locking means being coupled to one of said plates and being adapted for selectively engaging said walls of said truck bed.

* * * * *